358-218. XR 3,716,657 SR

United States Patent [19]

Niemyer, Jr.

[11] 3,716,657

[45] Feb. 13, 1973

[54] APPARATUS FOR INCREASING SIGNAL TO NOISE RATIO IN TELEVISION LOW LIGHT LEVEL SCENES

[75] Inventor: Le Roy L. Niemyer, Jr., Baltimore, Md.

[73] Assignee: Westinghouse Electric Corporation, Pittsburgh, Pa.

[22] Filed: April 9, 1969

[21] Appl. No.: 814,720

[52] U.S. Cl. ....178/7.2
[51] Int. Cl. ....H04n 5/38
[58] Field of Search.....178/7.2, 7.1, DIG. 3, DIG. 29

[56] References Cited

UNITED STATES PATENTS 2,929,869 3/1960 Hines et al. ....178/DIG. 3
3,077,517 2/1963 Schlicht ....178/7.2
3,316,349 4/1967 Loughlin ....178/7.2

*Primary Examiner*—Robert L. Griffin
*Assistant Examiner*—Donald E. Stout
*Attorney*—F. H. Henson and E. P. Klipfel

[57] ABSTRACT

A circuit arrangement for increasing the signal-to-noise ratio of the picture output signal of a television camera tube by alternately blanking the scanning of the image applied to the tube during at least one line scanning period and scanning, during a following line scanning period, a band which covers an adjacent image portion associated with the at least one blanked scanning line.

9 Claims, 6 Drawing Figures

T 5099 ✓
X 5245 ✓
X 514? ✓
X 51?? ✓
R

INVENTOR
LeRoy L. Niemyer, Jr.
Ernest P. Kipfl
ATTORNEY

APPARATUS FOR INCREASING SIGNAL TO NOISE RATIO IN TELEVISION LOW LIGHT LEVEL SCENES

BACKGROUND OF THE INVENTION

The present invention relates to television camera tubes, and particularly to circuits for controlling the operation of such tubes so as to increase their resolution, primarily under low light level conditions, without modifying the structure of the tubes themselves.

In the continuing development of television camera tubes, many advances have been made with regard to the ability to perform satisfactorily at low light levels. Since any camera system will produce a certain amount of noise which appears in its picture information signal, the sensitivity of a tube, i.e., the minimum level of illumination at which it can produce a useable signal, will depend on that level of illumination which will cause the signal-to-noise (S/N) ratio of the picture signal produced by the camera to exceed a certain predetermined value.

Prior efforts to create camera tubes having an improved low light level sensitivity have involved new camera tube designs intended to reduce noise levels and increase the efficiency with which the scanning converts the electrically stored image into an electrical signal and the development of new types of photocathodes capable of creating higher charge levels in response to a given illumination level. While efforts in these directions have resulted in more sensitive camera tubes, the improvements which can be thus realized have certain practical limits and are strongly dependent on major breakthroughs in one technical area or another.

Other approaches to increased sensitivity are based on modifications in the frequency passband of the system and the rate at which the camera tube target is scanned. While a decrease in the width of the picture signal passband serves to increase the S/N ratio for a given level of illumination, such a decrease also reduces the information content, i.e. the picture detail, of the signal. On the other hand, a decrease in the scan rate, which permits a decrease in the passband and hence an increase in the S/N ratio for a given illumination level, requires a complete modification of the synchronizing and deflection signals of the camera tube and also requires provision of additional processing circuitry for converting the derived picture signal into the type of signal required by existing television receivers.

SUMMARY OF THE INVENTION

It is a primary object of the present invention to overcome these drawbacks and difficulties.

Another object of the invention is to selectively increase the S/N ratio of a camera tube without modifying the tube itself.

Yet another object of the invention is to provide novel circuitry which permits the S/N ratio of the camera tube output to be altered in a selective manner.

Still another object of the invention is to selectively alter the S/N ratio of a camera tube output without modifying either the deflection rate of the scanning beam or the passband of the output signal from the tube.

These and other objects according to the invention are achieved by a method for controlling the operation of a television camera tube having a scanning beam which scans a target electrode presenting an electrically detectable image of the scene being televised, the scanning being effected by deflecting the beam linearly across the target electrode at a predetermined line scanning rate so as to scan successive parallel target strips. The method according to the invention is carried out by blanking the scanning beam during at least one line scanning period at regular intervals between individual line scanning periods during which the beam is active, and causing the beam to scan, during each active scanning period, a band of the target electrode which includes the strip associated with such active scanning period and at least part of one adjacent electrode strip.

The objects according to the invention are also achieved by the provision of a novel circuit arrangement in combination with a television camera tube having a target electrode for providing an electrically detectable image of the scene being televised, means for producing an electron beam substantially focussed on the target electrode, and means for repetitively deflecting the beam linearly across the target electrode at a predetermined line scanning rate so as to cause the beam to scan successive parallel strips of the target electrode. The novel circuitry according to the invention includes blanking means connected to the beam producing means for blanking the beam during at least one line scanning period at regular intervals between intervening individual line scanning periods during which the beam is active, and means associated with the tube for causing the diameter of the beam at the target to be greater than the distance between the center lines of adjacent target strips.

DESCRIPTION OF THE PREFERRED EMBODIMENTS

Figures 1, 2A, 2B, 3, 4, 5:
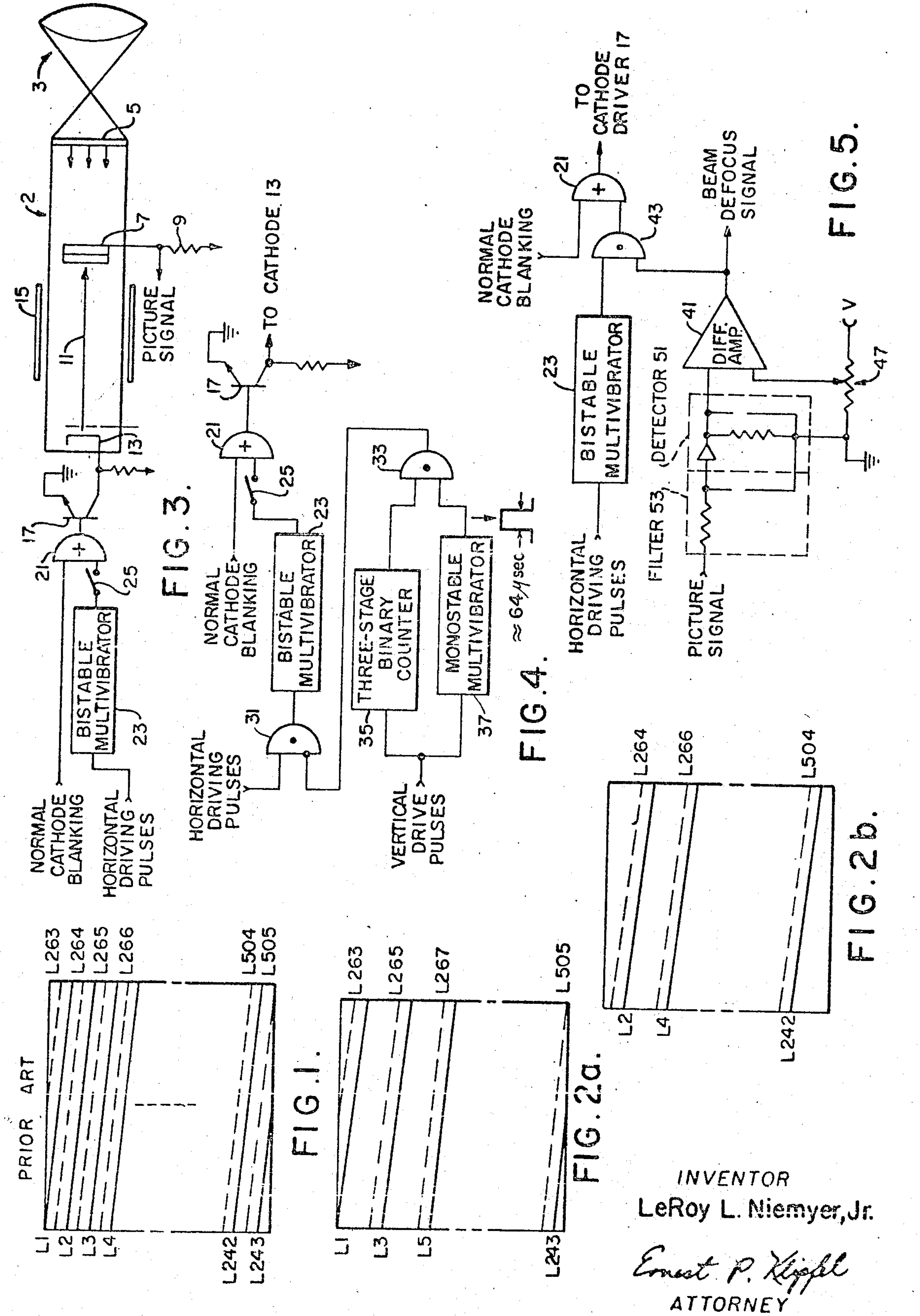
FIG. 1 is a pictorial view of the scanning pattern of a camera tube electron beam for one complete picture frame in accordance with the prior art.
FIG. 2*a* is a view similar to that of FIG. 1 illustrating the scanning pattern for two picture fields in accordance with the present invention.
FIG. 2*b* is a view similar to that of FIG. 2*a* for the next succeeding two picture fields.
FIG. 3 is a schematic diagram of a preferred embodiment of the invention.
FIG. 4 is a schematic diagram of a further preferred embodiment of the invention.
FIG. 5 is a schematic diagram of yet another preferred embodiment of the invention.

In the most commonly used television camera tubes, the amplitude of the picture signal produced at any instant will depend, among other things, on the cross-sectional area of the beam since, for a given scene illumination level, the quantity of charge released from the target electrode will be proportional to this area. The maximum cross-sectional area of the electron beam on the target electrode plane is normally limited by the requirement that there not be substantial overlapping between successively scanned target electrode strips and by the requirement for reproducing fine details of the scene being televised as accurately as possible.

However, when the brightness of the scene being televised drops below the minimum level to which the camera tube can respond, the reproduction of fine picture details is no longer of importance, the only important consideration then being the attainment of a signal which can yield some usable picture.

For this purpose, it has already been proposed to reduce the frequency passband of the camera output, this resulting in a reduction in the camera noise level. Of course, a reduction in the frequency passband results in a reduction in the resolution which the camera tube can achieve. However, since a reduction in the scene lighting level also reduces the resolution which can be achieved, a reduction in the passband under low light conditions will not markedly reduce the resolution which could otherwise be achieved. However, the passband can be reduced only by a limited amount because a certain minimum resolution must be maintained in order to produce a useful image.

It is also known to compensate for substantial reductions in the existing light level by reducing the rate at which the electron beam scans the target electrode. This permits an accompanying reduction in the signal passband to be effected. However, as has been mentioned above, this approach has certain drawbacks since it requires extensive modifications in all of the deflection and synchronizing signal circuits and requires subsequent processing for permitting the resulting information to be utilized by existing television receivers.

The present invention provides a novel technique for substantially increasing the S/N ratio of the camera tube picture signal when the illumination of the scene being televised drops below the level required by the camera tube when it is operating in its usual manner. The invention involves neither a reduction in the signal passband nor a reduction in either the horizontal or vertical electron beam scanning rate. Rather, a stepwise increase in the S/N ratio is achieved, according to the invention, by blanking the electron beam for a period equal to at least one scanning line at a time between intervening scanning periods during which the electron beam is active, or unblanked. According to a preferred embodiment of the invention, the electron beam is blanked during every other line scanning period. Then, during each period when the scanning beam is unblanked, it will scan a band of the target electrode which covers both the line, or strip, which would normally be scanned by the beam and adjacent areas which are normally scanned during the line scanning periods when the beam is blanked. In most cases, the electron beam will usually be sufficiently defocused to automatically scan these additional areas. However, in those cases where the beam is normally focused too sharply to cover these adjacent areas, it is only necessary to slightly defocus the beam at the time the periodic blanking procedure is initiated.

FIG. 1 is a pictorial view of the raster, or scanning pattern normally traced on the target electrode by the electron beam. This pattern is duplicated by the raster of a television received. FIG. 1 shows the scanning pattern for normal interlace scanning which involves the production of two scanning fields for each complete picture frame. According to usual television practice there are 525 substantially horizontal scanning lines per frame, there being 262 ½ horizontal scanning lines per field. Of these, 242 ½ lines form the actual picture field and the return of the beam to the top of the target electrode, or the top of the receiver screen in the case of a receiver, occurs during the first 20 scanning line periods after each vertical drive, or sync, pulse.

Thus for normal interlace scanning, the electron beam traverses the target electrode or receiver tube face 242 ½ times to trace the first picture field, the lines of this field being indicated as L1, L2, L3, L4, . . . L242 and L243, vertical blanking and return of the beam to the top of the target or tube face commencing at the middle of line L243. At the end of a time period equal to that required to produce 20 scanning lines, tracing of the second field begins at the middle of line L263 and continues through lines L264, L265, L266 . . . L504 and L505. At the end of the last line, a new vertical blanking pulse appears and the beam is returned to the upper left hand corner of the target electrode or receiver tube face. The scanning operation is then repeated.

If the illumination of the scene being televised should fall below the level required for enabling a usable picture to be produced when the scanning pattern illustrated in FIG. 1 is employed for a given camera tube, this scanning pattern can be modified, in accordance with the present invention, to produce the pattern illustrated in FIGS. 2*a* and 2*b*. The modified pattern according to the invention does not involve a change in either the horizontal or vertical scanning rates, i.e., the rates at which lines and fields are scanned. In accordance with a preferred embodiment of the invention, it is only necessary to blank every other scanning line.

Thus, as shown by the solid lines in FIG. 2*a*, the first field is produced by scanning the target electrode only during lines L1. L3, L5 . . . L243, the electron beam being blanked during the periods corresponding to the even numbered scanning lines. However, the operation of the tube deflection circuitry is not altered, it only being necessary to block production of electron beam during the even numbered line scanning periods.

After the first field has been traced, the electron beam is returned to the top center of the target electrode in the usual manner and since the beam is blanked only during even numbered scanning periods, the second field is produced by actively tracing scanning lines L263, L265, L267 . . . L505. This completes one picture frame.

Since successive scanning lines are now twice as far apart as they are during normal scanning, the electron beam can scan an area which is twice as wide as normal during each active scanning period. This will result in a substantial increase in the current produced at any given instant by the action of the electron beam on the target electrode. As has been mentioned above, in many cases the electron beam will already be sufficiently defocused to cover the desired area. However, if such is not the case, the beam can be automatically defocused at the time the alternate line blanking operation is commenced. Alternatively, the focus of the electron beam can remain unchanged since, as will be explained below with reference to FIG. 2*b*, those strips of the target electrode which are not scanned when the beam follows the path shown in FIG. 2*a* will be scanned during the next two fields.

If the beam is such that it impinges on the areas normally scanned during the blanked scanning periods, the signal current will increase in proportion to the increase in the area of the scanning beam. If, on the other hand, the beam scans only the area with which it is normally associated, the output signal current will be increased due to the fact that the scanning procedure according to the invention doubles the time between successive scannings of each elemental target electrode area. This will become more readily apparent from the following discussion of FIG. 2*b*.

After scanning line L505 of FIG. 2*a* has been completed, a vertical synchronizing pulse and retrace signal is produced to bring the electron beam back to the top of the target electrode. However, because each picture frame is composed of an odd number of scanning lines, and because the electron beam is blanked during every other scanning line, the next line traced by the beam will not be the line L1, but rater the line L2. To understand this it is only necessary to realize that because line L505 of the second picture field is traced, line L506 would be blanked, as would the succeeding even numbered lines up to line L524. This means that line L525 is not automatically blanked but that line L1, the next succeeding line and the first line of the next frame, would be blanked, while line L2 of this next frame is not blanked. Thus, for the third scanning field, lines L2, L4 . . . L242 are traced and for the fourth field lines L264, L262 . . . L504 are traced. Thus, during the period of four successive picture fields, every line of the normal image raster will be traced once. After the fourth field, the entire process is repeated, with line L1 being the first line of the next succeeding field which is traced. A television receiver receiving a signal produced when the blanking according to the invention is employed will reproduce picture information during each line scanning period for which the target electrode has been scanned and will reproduce a dark line for each line scanning period for which the electron beam of the camera tube has been blanked. Thus, picture information is provided for only half of the picture lines of each field. However, the resulting information is still substantially greater than it would be if the usual scanning technique had been employed when there was not sufficient lighting of the scene to produce a useful picture.

It will be noted that although picture information is provided for only one out of every two horizontal scanning lines, those lines which provide picture information vary from one field to another and picture information is provided once to every raster line during an interval of four picture fields. The result is an apparent vertical resolution which is higher than that which would be produced if the picture information containing scanning lines were in the same position for each picture frame. In addition, the scanning technique according to the invention results in the appearance of an unusual interlace pattern which can be detected by a trained observer. This interlace pattern creates the appearance of a rolling movement superimposed on the reproduced image. This does not involve a rolling of the image itself, but only a rolling of the dark scanning lines. The source of this rolling movement will become apparent from a consideration of FIGS. 2*a* and 2*b*. During the first picture field, two scanning lines between lines L3 and L5 are dark. During the next picture field it is the two lines between lines L265 and L267 which are dark. Thus, the two dark lines have moved upwardly by an amount equal to the separation between two adjacent raster lines. Then, in the third field, the dark area will be between lines L2 and L4 and will thus have moved up by one more scanning line. Finally, for the fourth field the dark area will be constituted by the raster lines between lines L264 and L266 and for the fifth field, which is identical with the first field, the two dark lines under consideration will have apparently moved up to the region between lines L1 and L3. Thus, there appears to be a net upward rolling movement of the dark area.

This rolling movement can be prevented by modifying the cathode beam blanking pattern from one group of four fields to the next. The manner in which this can be accomplished will be described in more detail below with reference to FIG. 4 of the drawings.

FIG. 3 is a circuit diagram illustrating one embodiment of the invention. There is illustrated a portion of a television camera including a secondary electron conductor (SEC) image tube 2 having an associated optical system 3 and including a photocathode 5 on which the image of the scene to be televised is focused by the optical system 3. The tube further includes a target electrode 7 connected to an output resistor 9 whose other end is connected to a bias voltage source and across which appears the camera tube picture signal. An electron image is derived from the light image focused on the photocathode and is accelerated to, and magnetically focused in the plane of, the target electrode 7. The target electrode 7 is scanned in the usual manner by an electron beam 11 produced by a cathode 13 and focused by suitable focusing coils which are not shown for the sake of clarity. These focusing coils also act to focus the electron image derived from the photocathode 5 onto the target electrode 7. The scanning by the electron beam is controlled by suitable deflection coils 15 and the production of the cathode beam is controlled by a cathode blank driver transistor 17. This transistor is of a type which causes an electron beam to be produced when no signal is applied to the transistor base and which blanks the production of the electron beam when a signal appears at the base. The arrangement thus far described is well-known in the art, as is its operation. Other types of camera tubes, such as a vidicon or even an image orthicon, could be employed.

The signal to the base of the cathode blank driver transistor appears at the output of an OR gate 21 having one input connected to receive the normal cathode blank signals produced in the television camera and another input connected to the output of a bistable multivibrator 23. The input of the bistable multivibrator is connected to receive the horizontal driving pulses which are also normally produced in the television camera. The circuit is arranged so that a signal applied to either input of the OR gate 21 will control transistor 17 so as to blank the production of electron beam 11. Bistable multivibrator 23 is of a type whose output state changes each time it receives a horizontal driving pulse so that after receipt of each alternate driving pulse it will produce an output which acts to blank the production of an electron beam until the next succeeding horizontal driving pulse has been produced. Of course, the production of an electron beam is also blanked by the usual cathode blanking signals, these being produced during both the horizontal and vertical retrace intervals. It will be readily apparent that the circuit of FIG. 3 will automatically produce the type of scanning described above with reference to FIGS. 2*a* and 2*b*. It should be particularly noted that the circuitry required for achieving this result is extremely simple and will thus increase the cost of a camera constructed in accordance with the invention by a very small amount. Moreover, because of the extreme simplicity of this circuitry, it could easily be incorporated in existing cameras, particularly since none of the synchronizing or deflection circuitry of existing cameras need be modified for operation in accordance with the invention.

The bistable multivibrator could be connected to its input of OR gate 21 by a simple manually operated switch 25 which is closed only when light conditions are such that the target electrode of the tube is to be scanned in accordance with the invention.

FIG. 4 is a circuit diagram of a modified scanning control circuit according to the invention which can be utilized when it is desired to suppress the rolling effect which will be produced by the circuit of FIG. 3 and which has been discussed above. The circuit of FIG. 4 differs from that of FIG. 3 in that the horizontal driving pulses produced in the camera are not applied directly to the input of the bistable multivibrator 23 but rather via an ANDNOT gate 31 having a direct input connected to receive the horizontal driving pulses and having a negated input connected to the output of an AND gate 33. One input of the gate 33 is connected to the output of a 3-stage binary counter 35 while the other input of the gate 33 is connected to the output of a monostable multivibrator 37 constructed to produce an output pulse having a duration approximately equal to one line scanning period (approximately 64 μsec.) each time a pulse is applied to its input. The inputs of both the counter 35 and multivibrator 37 are connected to receive the vertical driving pulses produced in the camera. Since a vertical drive pulse is produced at the start of each scanning field, the counter 35 will produce no output during four successive scanning field periods and will produce a positive output during the next succeeding group of four successive scanning field periods, its output state changing after every four field scanning periods. On the other hand, the monostable multivibrator 37 will produce an output pulse in response to each vertical driving pulse. However, these output pulses from multivibrator 37 will appear at the output of AND gate 33, and hence at the negated input of gate 31, only during each group of four field scanning periods for which an output is produced by counter 35.

Thus, during four successive field scanning periods, no signal is applied to the negated input of ANDNOT gate 31 while at the beginning of each of the four next succeeding scanning field periods a 64 μsec. pulse will be applied to the negated input of gate 31. Since each such pulse has a duration equal to one line scanning period, its effect will be to prevent the transmission of one horizontal driving pulse to the input of bistable multivibrator 23 at the start of each of the latter four field scanning periods.

The results produced by the circuit of FIG. 4 will be best understood by referring once again to FIGS. 2*a* and 2*b*. During a first group of field scanning periods, for which no output is produced by gate 33 of FIG. 4, the first line of the scanning raster will be L1, L263, L2 and L264, respectively. The last active scanning line of the fourth field will be L504 and the first line of the next preceding raster, the fifth raster, would normally be L1. However, because at the start of the fifth raster the output from binary counter 35 will have switched to its "ONE" state, there will appear at the start of the fifth field a pulse at the negated input of gate 31 and this pulse will have a duration equal to one line scanning period. This pulse will thus prevent the transmission of one horizontal driving pulse to the bistable multivibrator 23. As a result, the bistable multivibrator 23 will cause the first scanning line of the fifth field to be line L2. At the beginning of the sixth field another inhibit pulse will be applied to the negated input of gate 31 so that bistable multivibrator 23 will cause the first scanning line of this sixth field to be line L263 rather than line L264. Similarly, for the seventh and eighth scanning fields, the blocking of one horizontal driving pulse will cause the first scanning line to be L1 and L264, respectively. At the start of the ninth field, binary counter 35 is once again in its 0 state and the cycle is repeated for the next eight scanning fields.

It can be readily shown that the effect of this sequence is to suppress the roll appearing in the received picture and to replace it by an apparent oscillation of the dark scanning lines, this oscillation covering a vertical distance equal to the separation between four adjacent scanning lines and being practically undetectable since it is not as noticeable as the apparent unidirectional movement occurring when the circuitry shown in FIG. 3 is employed.

While scanning pattern modifying circuits according to the invention can be activated simply by operating a manual switch, it may also be desirable to provide means for automatically activating such circuits when the illumination of the scene being televised falls below a predetermined level. FIG. 5 shows one such circuit for achieving this result. This circuit includes a differential amplifier 41 having its output connected to one input of an AND gate 43 whose output is connected to OR gate 21. The other input of gate 43 is connected to the output of multivibrator 23 so that the alternate line blanking signals from multivibrator 23 will be transmitted to gate 21 only when a signal appears at the output of differential amplifier 41. One input of amplifier 41 is connected to a threshold voltage source 45 which is set to provide a voltage corresponding to the light level at which the scanning of the target electrode is to be carried out in accordance with the invention.

The signal input of differential amplifier 41 is connected to the output of an amplitude detector circuit 51 whose input is connected to a filter circuit 53 the input of the filter circuit 53 being connected to receive the picture signal from the camera image tube. Both the filter 53 and detector 51 can be constructed in any well-known manner such as those illustrated. Filter 53 acts to select the frequency band of interest and to filter out noise, while detector 51 acts to convert the alternating picture signal into a direct signal whose amplitude is proportional to the picture signal strength.

The amplifier is arranged so that when the output of detector 51 drops below a predetermined value, indicating that the illumination of the scene being televised has correspondingly dropped below a predetermined level, the reference voltage applied by unit 47 will cause amplifier 41 to produce an output signal which enables gate 43 so as to cause the output of bistable multivibrator 23 to become effective to control the blanking operation of cathode driver transistor 17. If it is desired to defocus the tube electron beam when the alternate line blanking operation commences, the output from differential amplifier 41 can also supply a suitable beam defocus signal which can be applied to control the beam focusing coils in any well-known manner. This could also be achieved by applying the beam defocus signal to one of the electron beam deflection coils.

It will be understood that the above description of the present application is susceptible to various modifications, changes and adaptations.

What is claimed is:

1. A method for controlling the operation of a television camera tube having a scanning beam, said tube including a target electrode having an electrically detectable image of the scene being televised, the scanning being effected by deflecting the beam linearly across the target electrode at a predetermined line scanning rate so as to scan successive parallel target strips during successive trace intervals of said beam, comprising blanking the scanning beam during the trace interval during at least one line scanning period at regular intervals between individual line scanning periods when the beam is active during the trace interval.

2. A method as defined in claim 1 comprising the further step of causing the beam to scan, during each trace interval of the beam, a band of the target electrode which includes the target strip associated with said trace interval and at least part of one adjacent target strip.

3. In combination with a television camera tube having a target electrode for providing an electrically detectable image of the scene being televised, means for producing an electron beam substantially focused on the target electrode, and means for repetitively deflecting the beam linearly across the target electrode at a predetermined line scanning rate so as to cause the beam to scan successive parallel strips of the target electrode during successive trace intervals of said beam, the improvement comprising blanking means selectively connected to said beam producing means for blanking the beam during the trace interval at least one line scanning period at regular intervals between intervening individual line scanning periods when the beam is active during the trace interval.

4. An arrangement as defined in claim 3 further comprising means associated with said tube to defocus the beam for causing the diameter of the beam at the target electrode to be greater than the distance between the center lines of adjacent target strips.

5. An arrangement as defined in claim 3 wherein said blanking means comprise a bistable multivibrator connected to receive the horizontal driving pulses normally applied to said camera tube so as to cause its output state to change in response to each successive horizontal driving pulse, said multivibrator having its output connected to said electron beam producing means for blanking the electron beam whenever the output of the said multivibrator is in one of its states.

6. An arrangement as defined in claim 5 wherein said camera tube further includes a blanking amplifier connected to control the production of the electron beam, and an OR gate having its output connected to said blanking amplifier and having one input selectively connectable to the output of said multivibrator.

7. An arrangement as defined in claim 5 further comprising: an ANDNOT gate having an output connected to the input of said multivibrator, a direct input connected to receive the horizontal driving pulses normally applied to said tube, and a negated input; an AND gate having an output connected to said negated input of said ANDNOT gate and having two inputs; a three stage binary counter having its third stage output connected to one input of said AND gate and having its input connected to receive the vertical driving pulses normally applied to said tube; and a monostable multivibrator having an output connected to the other input of said AND gate and an input connected to receive the vertical driving pulses normally applied to said tube, said monostable multivibrator being arranged to produce an output pulse having a duration substantially equal to one trace interval of said beam in response to the appearance of each vertical driving pulse.

8. An arrangement as defined in claim 5 further comprising means connected to said bistable multivibrator for blocking the delivery of one horizontal driving pulse to said multivibrator at the start of each field scanning period of every other group of four field scanning periods of said tube.

9. An arrangement as defined in claim 3 further comprising automatic control means connected to receive the picture signal produced by said camera tube and to produce an output when the average value of this signal is below a predetermined level, and switching means connected to said control means and said blanking means for rendering said blanking means operative only when an output is produced by said control means.

* * * * *